(12) United States Patent
Christensen et al.

(10) Patent No.: US 6,618,745 B2
(45) Date of Patent: *Sep. 9, 2003

(54) LINKING DEVICE IN A PROCESS CONTROL SYSTEM THAT ALLOWS THE FORMATION OF A CONTROL LOOP HAVING FUNCTION BLOCKS IN A CONTROLLER AND IN FIELD DEVICES

(75) Inventors: Daniel D. Christensen, Austin, TX (US); Steven L. Dienstbier, Round Rock, TX (US)

(73) Assignee: Fisher Rosemount Systems, Inc., Austin, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/393,474

(22) Filed: Sep. 10, 1999

(65) Prior Publication Data

US 2003/0014536 A1 Jan. 16, 2003

(51) Int. Cl.$^7$ ................................................ G06F 15/16
(52) U.S. Cl. ........................ 709/201; 709/200; 709/223; 709/224; 709/238; 702/182; 702/183; 702/188
(58) Field of Search ................................ 709/223, 224, 709/238, 200, 201; 702/182, 183, 188

(56) References Cited

U.S. PATENT DOCUMENTS 4,271,505 A    6/1981   Menot et al. ................. 370/85

(List continued on next page.)

FOREIGN PATENT DOCUMENTS

DE    195 10 466 A1    10/1996

(List continued on next page.)

OTHER PUBLICATIONS

Fieldbus Foundation™ Manual, "Preliminary Specifications," Aug. 28, 1995, FF–94–004, including Fieldbus System Architecture FF–800 Rev. 1.0; System Management FF–880 Rev. 1.0; Network Management FF–801 Rev. 1.0; Message Specification FF–870 Rev. 1.0; Access Sublayer FF–875 Rev. 1.0; Data Link Protocol Specification FF–822 Rev. 1.0; Data Link Services Subset FF–821 Rev. 1.0; Communication Profile FF–940 Rev. FS 1.0; Function Block Application Process (Part) FF–890 Rev. 1.2; and Function Block Application Process (Part 2) FF–891 Rev. 1.2.

(List continued on next page.)

Primary Examiner—Nabil El-Hady
(74) Attorney, Agent, or Firm—Marshall, Gerstein & Borun (57) ABSTRACT

A system and method for interfacing a plurality of field devices which are communicatively coupled on a communication network via a standard communication protocol with a process control system uses a linking device to seamlessly integrate communications between the field devices and a controller within the process control system. The system and method uses the linking device to emulate the communication characteristics of the field devices to link information in field devices with information in a controller of the control system, thereby allowing control loops to include combinations of function blocks from both the field devices and the controller. The linking device uses a link active schedule to monitor substantially all communications on the communication network connecting the field devices and selectively processes and analyzes the monitored communications. The information processed by the linking device, which may include function block information, is automatically routed from a field device to the controller or from the controller to a field device. Other information, such as field device identification information and/or communications diagnostic information, may be collected by the linking device and sent to a user.

43 Claims, 5 Drawing Sheets

U.S. PATENT DOCUMENTS

| | | | | |
|---|---|---|---|---|
| 4,627,045 | A | 12/1986 | Olson et al. | 370/16 |
| 4,691,328 | A | 9/1987 | Sterling, Jr. et al. | 375/36 |
| 4,831,558 | A | 5/1989 | Shoup et al. | 364/550 |
| 4,918,690 | A | 4/1990 | Markkula, Jr. et al. | 370/94 |
| 4,955,305 | A | 9/1990 | Garnier et al. | 112/121.11 |
| 4,974,625 | A | 12/1990 | Paullus et al. | 137/85 |
| 4,976,144 | A | 12/1990 | Fitzgerald | 73/168 |
| 5,014,185 | A | 5/1991 | Saito et al. | 364/188 |
| 5,023,869 | A | 6/1991 | Grover et al. | 370/84 |
| 5,109,692 | A | 5/1992 | Fitzgerald | 73/168 |
| 5,148,433 | A | 9/1992 | Johnson et al. | 371/11.3 |
| 5,193,189 | A | 3/1993 | Flood et al. | 395/650 |
| 5,197,328 | A | 3/1993 | Fitzgerald | 73/168 |
| 5,404,524 | A | 4/1995 | Celi, Jr. | 395/700 |
| 5,434,774 | A | 7/1995 | Seberger | 364/172 |
| 5,439,021 | A | 8/1995 | Burlage et al. | 137/84 |
| 5,451,923 | A | 9/1995 | Seberger et al. | 340/310.06 |
| 5,469,150 | A | 11/1995 | Sitte | 340/825.07 |
| 5,469,548 | A | 11/1995 | Callison et al. | 395/441 |
| 5,485,455 | A | 1/1996 | Dobbins et al. | 370/60 |
| 5,530,643 | A | 6/1996 | Hodorowski | 364/191 |
| 5,558,115 | A | 9/1996 | Lenz et al. | 137/86 |
| 5,573,032 | A | 11/1996 | Lenz et al. | 137/486 |
| 5,592,622 | A | 1/1997 | Isfeld et al. | 395/200.02 |
| 5,631,825 | A | 5/1997 | van Weele et al. | 364/188 |
| 5,650,777 | A | 7/1997 | Westfield et al. | 340/870.11 |
| 5,684,451 | A | 11/1997 | Seberger et al. | 340/310.06 |
| 5,978,850 | A | * 11/1999 | Ramachandran et al. | 709/228 |
| 5,980,078 | A | * 11/1999 | Krivoshein et al. | 364/131 |
| 5,995,916 | A | * 11/1999 | Nixon et al. | 702/182 |
| 6,014,612 | A | * 1/2000 | Larson et al. | 702/183 |
| 6,088,665 | A | * 7/2000 | Burns et al. | 702/188 |
| 6,285,966 | B1 | * 9/2001 | Brown et al. | 702/188 |
| 6,298,308 | B1 | * 10/2001 | Reid et al. | 702/56 |
| 6,298,454 | B1 | * 10/2001 | Schleiss et al. | 714/37 |
| 6,377,859 | B1 | * 4/2002 | Brown et al. | 700/79 |

FOREIGN PATENT DOCUMENTS

| | | |
|---|---|---|
| EP | 0 449 458 A1 | 10/1991 |
| EP | 0 450 116 A1 | 10/1991 |
| EP | 0 562 333 A2 | 9/1993 |
| EP | 0 575 150 A2 | 12/1993 |
| EP | 0 604 091 A2 | 6/1994 |
| WO | WO 92/04676 | 3/1992 |
| WO | WO 94/22776 | 10/1994 |
| WO | WO 96/12993 | 5/1996 |

OTHER PUBLICATIONS

"Fieldvue® ValveLink™ Series VL2000 Software," Fisher–Rosemount Bulletin 62.1:VL2000, pp. 1–6 (Nov. 1995).

"Fieldvue® VL2000 Series Software User Guide," Fisher Controls, Version 2.0 (Jun. 1996).

"Fieldvue® Digital Valve Controller Type DVC5000 Series," Fisher–Rosemount Bulletin 62.1:DVC5000, pp. 1–12 (Jun. 1994).

"Fieldvue® Digital Valve Controller DVC5000 Series Remotely Accessible Information," Fisher Controls Bulletin 62.1:DVC5000(S1), pp. 1–2 (Jun. 1994).

"Fieldvue® Digital Valve Controller Type DVC5000 Series," Fisher Controls Form 5335, pp. 1–35 and Errata Sheet (Jun. 1994).

Fisher–Rosemount Systems, "Fieldbus Technical Overview Understanding Foundation™ Fieldbus Technology," 27 pages, 1997.

"Foundation™ Specification, Function Block Application Process," Part 3, 155 pages, 1995–1996.

Fieldbus Foundation™, "Technical Overview," FD–043 Revision 1.0, 29 pages, 1996.

Fromberger, "Feldbusfähige, intelligente Sensoren," Messen und Prüfen, vol. 27, No. 7, pp. 332, 334–340, 1991.

Watt, "The Double–Distributed Control Network," Thesis submitted to Thayer School of Engineering, Dartmouth College, Hanover, N.H. (Jan. 1984).

Zielinski et al., "Asset Management Using Fieldbus," Fisher–Rosemount Systems, Inc, pp. 1–14 (1997).

"Advanced Systems Simplify Control," Machine Design, vol. 68, No. 12, pp. 118, 120 (Jul. 11, 1996).

Black, "Combining Lan Technology with Smart Sensors to Provide Predictive Maintenance, Diagnostics and Alarm Systems," Proceedings of the Industrial Computing Conference, Chicago, vol. 3, Sep. 19, 1993, Industrial Computing Society/Instrument Society of America, pp. 345–354 (1993).

Zielinski et al., "Issues for Digital Field Instrument Networks," INTECH, pp. 92–94 (1989).

* cited by examiner

LINKING DEVICE IN A PROCESS CONTROL SYSTEM THAT ALLOWS THE FORMATION OF A CONTROL LOOP HAVING FUNCTION BLOCKS IN A CONTROLLER AND IN FIELD DEVICES

FIELD OF THE INVENTION

The present invention relates generally to process control systems and, more specifically, to an intelligent linking device and method for interfacing smart field devices that use a standard communication protocol to a process control system which may not use that communication protocol.

DESCRIPTION OF THE RELATED ART

Modem process control systems are typically microprocessor-based distributed control systems (DCSs). A traditional DCS configuration includes one or more user interface devices, such as workstations, connected by a databus (e.g., Ethernet) to one or more controllers. The controllers are generally physically close to a controlled process and are connected to numerous electronic monitoring devices and field devices such as electronic sensors, transmitters, current-to-pressure transducers, valve positioners, etc. that are located throughout the process.

In a traditional DCS, control tasks are distributed by providing a control algorithm within each of the controllers. The controllers independently execute the control algorithms to control the field devices coupled to the controllers. This decentralization of control tasks provides greater overall system flexibility. For example, if a user desires to add a new process or part of a process to the DCS, the user can add an additional controller (having an appropriate control algorithm) connected to appropriate sensors, actuators, etc. Alternatively, if the user desires to modify an existing process, new control parameters or control algorithms may, for example, be downloaded from a user interface to an appropriate controller via the databus.

To provide for improved modularity and inter-manufacturer compatibility, process controls manufacturers have more recently moved toward even further decentralization of control within a process. These more recent approaches are based on "smart" field devices that communicate using an open protocol such as the HART®, PROFIBUS®, WORLDFIP®, Device-Net®, CAN, and FIELDBUS® protocols. These smart field devices are essentially microprocessor-based devices such as sensors, actuators, etc. that, in some cases, such as with Fieldbus devices, also perform control loop functions traditionally executed by a DCS controller. Because some smart field devices provide control capability and communicate using an open protocol, field devices from a variety of manufacturers can communicate with one another on a common digital databus and can interoperate to execute a control loop without the intervention of a traditional DCS controller.

The Fieldbus communication protocol is one particularly popular open communication protocol that is used by some smart field devices. As is generally known, Fieldbus provides both synchronous (i.e., scheduled) communications and asynchronous (i.e., token ring type) communications on a protocol bus, these communications being performed according to a bus schedule created by the system designer. The schedule may define when each device or software component within a device can communicate on the bus, when different components should execute, when asynchronous communications take place, etc. In general, the scheduled/synchronous communications are used for signals related to actual process control activities while the asynchronous communications are used to convey secondary information, for example, to and from a user or to implement other activities not directly necessary for process control.

In operation, the control process may require information to be exchanged between the field devices. For example, the synchronous communications on the protocol bus may be scheduled so that one of the field devices provides information (e.g., function block parameters) to another one of the smart field devices on the protocol bus. Similarly, the asynchronous communications on the protocol bus may be used to convey other information such as configuration information between the smart field devices and the user interface.

Prior art process control systems do not allow a seamless integration of smart field devices because they do not enable the linking of field device information, such as function block information resident in one or more of the field devices, with function block information resident in the controller. As a result, function block information associated with a given control loop must reside entirely within the controller or entirely within the field devices on a given protocol bus.

Additionally, with current linking devices and methods, troubleshooting communication problems and configuration errors associated with the field devices on the protocol bus is very difficult because current devices do not automatically monitor and/or analyze the communications on the protocol bus. As a result, users at the system level cannot easily identify a problem, for example, with a particular one of the field devices and are typically only informed by the system via the user interface that the overall process is not operating properly.

SUMMARY OF THE INVENTION

The invention provides an intelligent linking device that enables the seamless integration of smart field devices that are communicatively coupled via a nonproprietary protocol bus with a process control system having one or more controllers that do not necessarily communicate using the non-proprietary protocol. Generally speaking, the liking device functions as a communication gateway or bridge that seamlessly conveys information resident in the one or more smart field devices to a controller and seamlessly conveys information resident in a controller to one or more smart field devices. More particularly, function block information resident in the field devices is linked with function block information in a controller so that control loops can be more flexibly configured to include combinations of field device function blocks and controller resident function blocks, thereby eliminating the above-noted constraint of prior art systems.

Additionally, the intelligent linking device monitors and analyzes the communications on the field device protocol bus to enable the troubleshooting of communication problems, configuration errors, etc. from a user terminal at the system level. Specifically, the linking device may compare actual synchronous and asynchronous communications on the protocol bus to a link active schedule, which defines scheduled times at which particular field devices should be communicating on the bus, to identify possible communication problems with particular field devices that would otherwise be extremely difficult for a system user to identify using conventional troubleshooting techniques.

A method in accordance with one aspect of the invention enables interfacing between a plurality of field devices communicatively coupled together via a communication network that uses a standard communication protocol to a controller and a user interface. The method uses a linking device coupled to the controller and the field devices and includes the steps of monitoring substantially all communications on the communication network using the linking device, selectively processing at least some of the monitored communications in the linking device to produce first field device information that is associated with at least one of the field devices, and sending the first field device information to the controller.

The method may further include the steps of generating second field device information in the controller and sending the second field device information to at least one of the field devices. The first and second information may include function block information.

The step of selectively processing the monitored communications may include the steps of producing diagnostic information associated with the communications on the communication network, producing information associated with the linking and timing of the communications on the communication network, producing communication statistics associated with the communications on the communication network, and/or producing identification information associated with one of the field devices. The method may further include the steps of comparing the identification information to commissioning information stored in a memory of the linking device, determining a discrepancy between the commissioning information and the identification information based on the comparison, and notifying a user of the discrepancy.

In accordance with yet another aspect of the invention, a linking device for interfacing with a plurality of field devices having function blocks communicatively coupled via a communication network that uses a standard communication protocol and a controller, includes a communication stack communicatively coupled to the communication network that uses the communication protocol to monitor substantially all communications on the communication network. The linking device may further include a connection manager that uses the communication stack to coordinate communications on the communication network, a function block data manager that selectively processes at least some of the monitored communications to produce function block information associated with at least one of the field devices, and a database manager that sends the function block information to the controller.

The linking device may also include a diagnostic manager that selectively processes at least some of the monitored communications to produce diagnostic information associated with the communications on the communication network. The linking device may further include a live list manager that stores a live list identifying the devices attached to the communication network, and an auto-sense manager that uses the live list to selectively process the monitored communications to produce identification information associated with at least one of the field devices on the communication network.

DESCRIPTION OF THE PREFERRED EMBODIMENTS

While a device and method for interfacing smart field devices to a process control system is described in detail in conjunction with a process control system that implements process control functions in a decentralized or distributed manner using Fieldbus devices, it should be noted that the invention can be used with process control systems that perform control functions using other types of field devices and communication protocols, including protocols that rely on other than two-wire buses and protocols that support only analog or both analog and digital communications, such as those mentioned previously. More generally, the invention can be used in any other process control system that performs distributed control functions.

Before discussing the details of the invention, a general description of the Fieldbus protocol, field devices configured according to this protocol, and the way in which communication occurs in a process control system that uses the Fieldbus protocol will be provided. However, it should be understood that, while the Fieldbus protocol is a relatively new all-digital communication protocol developed for use in process control systems, this protocol is known in the art and is described in detail in numerous articles, brochures and specifications published, distributed, and available from, among others, the Fieldbus Foundation, a not-for-profit organization headquartered in Austin, Tex.

The Fieldbus protocol is an all-digital, serial, two-way communication protocol that provides a standardized physical interface to a two-wire loop or bus interconnecting field equipment such as sensors, actuators, controllers, valves, etc. located in an instrumentation or process control environment of, for example, a factory or a plant. The Fieldbus protocol provides, in effect, a local area network for field devices within a process, which enables these field devices to interoperate to perform control functions at locations distributed throughout a process and to communicate with one another before and after the performance of these control functions to implement an overall control strategy.

Figure 1:
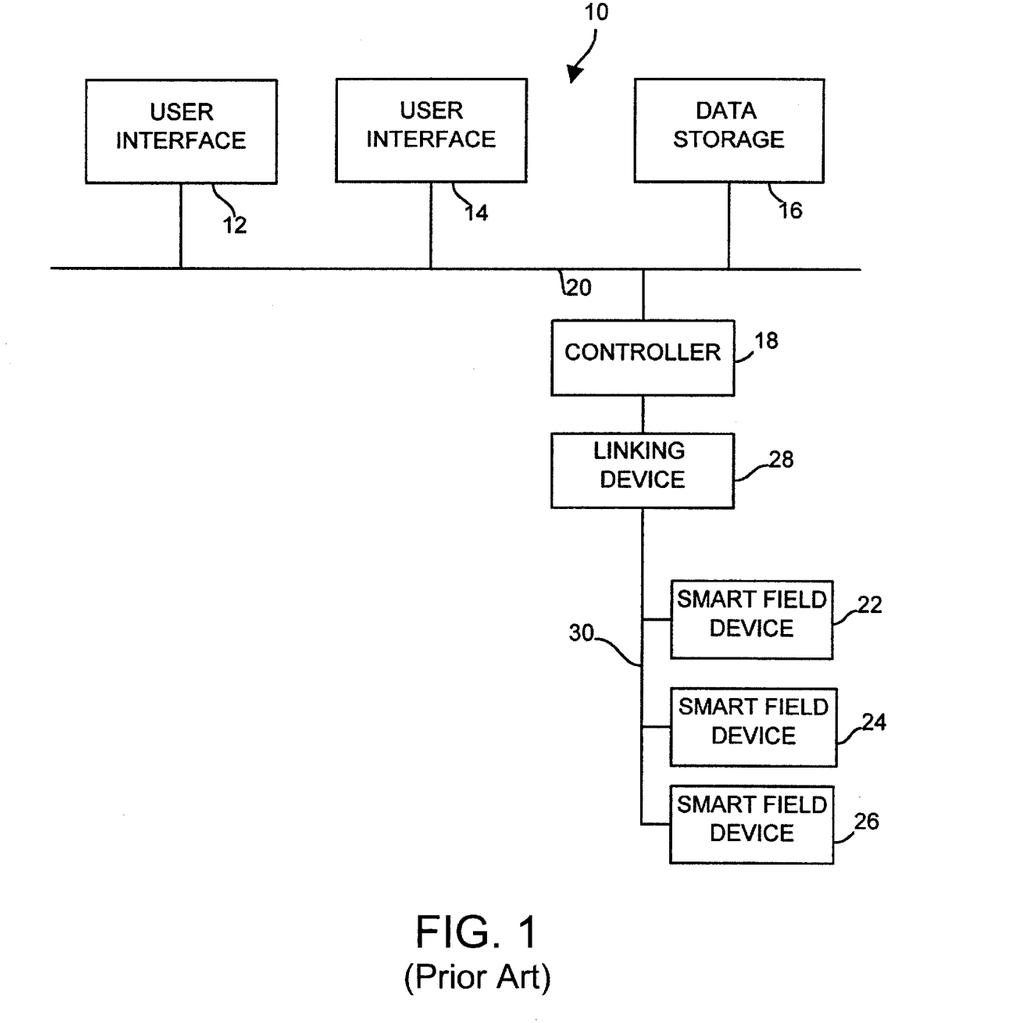
FIG. 1 is a schematic block diagram of an exemplary process control system having a linking device that communicatively links smart field devices which communicate using a standard communication protocol to a controller.

FIG. 1 illustrates an exemplary process control system 10 that uses, for example, Fieldbus field devices. The process control system 10 includes user interfaces 12 and 14, which may be, for example, workstations connected in a communication network to a number of other devices such as a data storage device 16 and a controller 18 via a system level databus 20. The system level databus 20 may be an Ethernet databus or any other databus suitable for the transmission of data.

The controller 18 may be a DCS controller and may communicate with the user interfaces 12 and 14 using a proprietary communication protocol, or in any other suitable manner, via the system level databus 20. For example, the controller 18 may send alarm and status information to the user interfaces 12 and 14 and may additionally receive user commands/requests from the user interfaces 12 and 14 via the system databus 20. The controller 18 may further include control algorithms for use in controlling field devices that are connected to the controller 18 in any conventional or any other desired manner.

In particular, the controller 18 is in communication with smart field devices 22–26 via a linking device 28. The field devices 22–26 are connected in a communication network via a non-proprietary protocol databus 30 and communicate with one another and the linking device 28 to execute one or more process control loops either in conjunction with or independently from the controller 18. The smart field devices 22–26 may be, for example, Fieldbus devices, in which case the nonproprietary protocol databus 30 employs the Fieldbus signal protocol discussed in more detail below. However, other types of devices and protocols could be used as well.

While the smart field devices 22–26 are illustrated in FIG. 1 as being connected to the non-proprietary protocol databus 30 in a standard bus-type configuration, in which multiple devices are connected to the same pair of wires, the Fieldbus protocol allows other device/wire topologies including point-to-point connections, in which each device is connected to a controller or a host via a separate two-wire pair (similar to typical 4–20 mA analog DCS systems), and tree or "spur" connections in which each device is connected to a common point in a two-wire bus that may be, for example, a junction box or a termination area in one of the field devices within a process control system.

Each of the smart field devices 22–26 is capable of communicating over the non-proprietary protocol databus 30 and is capable of independently performing one or more process control functions using data acquired by the field device from the process or from a different field device via communication signals on the bus 30. In particular, Fieldbus devices are capable of directly implementing portions of an overall control strategy that, in the past, were performed entirely within a DCS controller.

Figure 2:
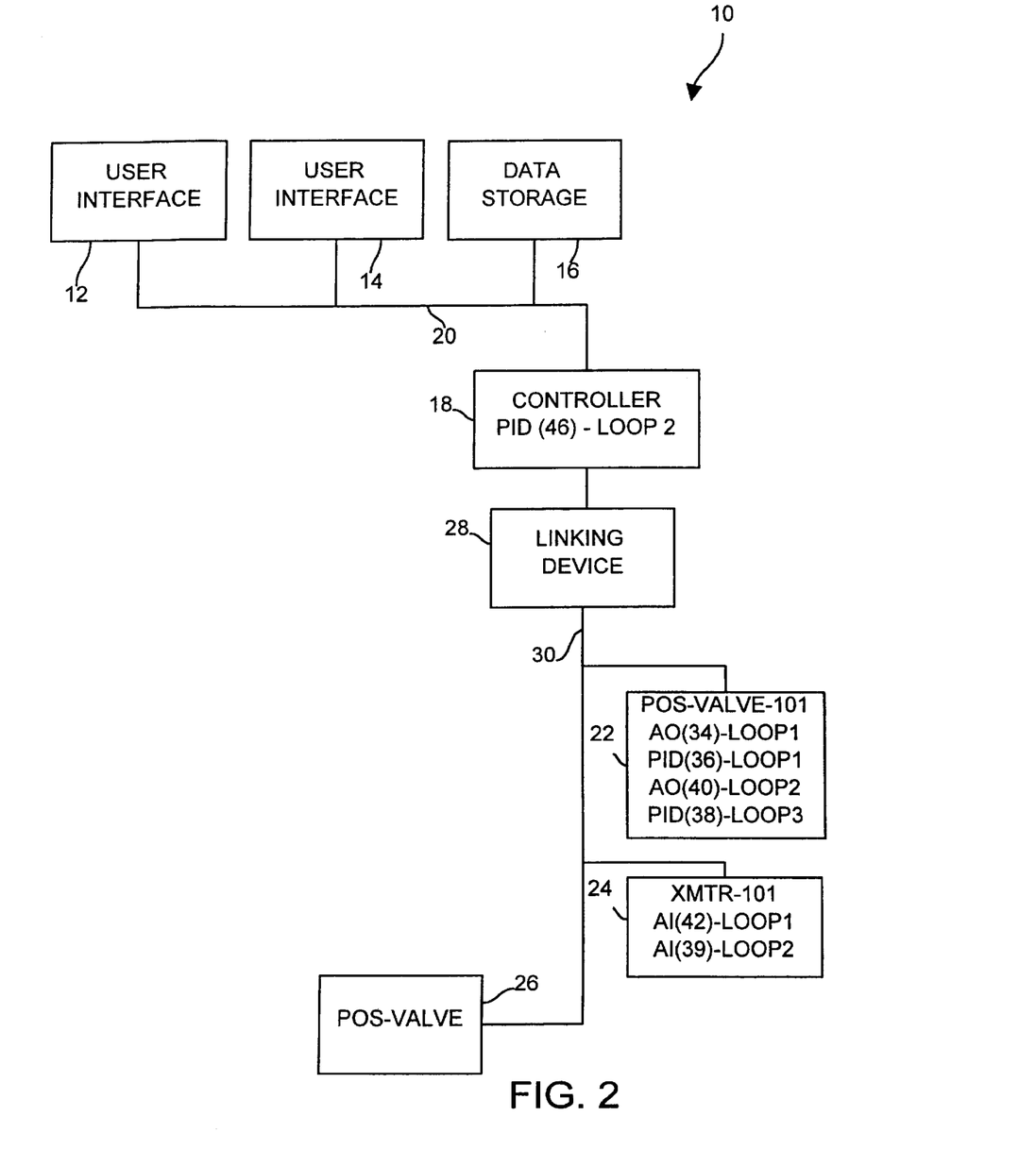
FIG. 2 is a schematic block diagram illustrating function blocks within the field devices and the controller of the process control system of FIG. 1.

Referring now to FIG. 2, a block diagram of the process control system 10 depicting the smart field devices 22 and 26 as positioner/valve devices and the device 24 as a transmitter also illustrates the function blocks associated with the positioner/valve 22, the transmitter 24, and the controller 18. The positioner/valve 22 includes a number of function blocks including an analog output (AO) function block 34, two PID function blocks 36 and 38, and an analog output (AO) function block 40. The transmitter 24 includes two analog input (AI) function blocks 42 and 44, and the controller 18 includes a PID function block 46. In this example, the controller 18 uses a control protocol that is similar to the Fieldbus protocol in that the function blocks within the controller 18 use many of the same attributes or fields as Fieldbus function blocks. However, the controller 18 uses a different communication protocol than the Fieldbus protocol.

The different function blocks of FIG. 2 may interoperate (by communicating over the protocol bus 30 and via the linking device 28) in a number of control loops and the control loops in which the function blocks of the positioner/valve 22, the transmitter 24, and the linking device 28 are located are identified in FIG. 2 by a loop identification block connected to each of these function blocks. Thus, as illustrated in FIG. 2, the AO function block 34 and the PID function block 36 of the positioner/valve 22 and the AI function block 42 of the transmitter 24 are connected within a control loop indicated as LOOP1, while the AO function block 40 of the positioner/valve 22, the AI function block 44 of the transmitter 24, and the PID function block 46 of the controller 18 are connected in a control loop indicated as LOOP2. The other PID function block 38 of the positioner/valve 22 is connected within a control loop indicated as LOOP3.

Figure 3:
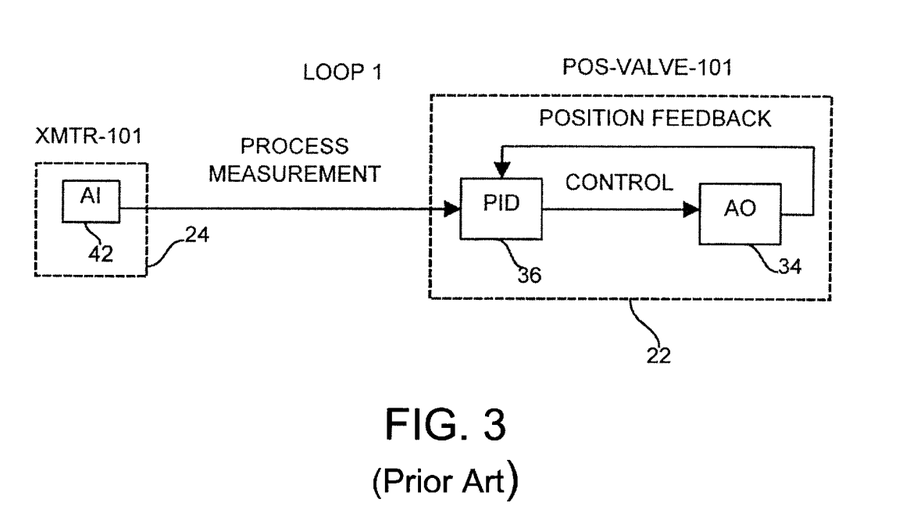
FIG. 3 is an exemplary control loop schematic for a process control loop within the process control system of FIG. 1.

The interconnected function blocks making up the control loop indicated as LOOP1 in FIG. 2 are illustrated in more detail in the schematic of this control loop depicted in FIG. 3. As can be seen from FIG. 3, the control loop LOOP1 is formed by communication links between the AO function block 34 and the PID function block 36 of the positioner/valve 22 and the AI function block 42 of the transmitter 24 (FIG. 2). The control loop diagram of FIG. 3 illustrates the communication links between these function blocks using lines that interconnect the process and control inputs and outputs of these functions blocks. Thus, the output of the AI function block 42, which may comprise a process measurement or process parameter signal, is communicatively coupled via the bus 30 to the input of the PID function block 36, which has an output comprising a control signal that is communicatively coupled to an input of the AO function block 34. An output of the AO function block 34, which comprises a feedback signal indicating, for example, the position of the valve 22, is connected to a control input of the PID function block 36. The PID function block 36 uses this feedback signal along with the process measurement signal from the AI function block 42 to implement proper control of the AO function block 34. Of course, the connections indicated by the lines in the control loop diagram of FIG. 3 may be performed internally within a field device when, as with the case of the AO and the PID function blocks 34 and 36, the function blocks are within the same field device (e.g., the positioner/valve 22), or these connections may be implemented over the protocol bus 30 using, for example, standard Fieldbus synchronous communications. Of course, other control loops are implemented by other function blocks that are communicatively interconnected in other configurations and the function blocks of any loop may be in any desired device, such as, for example, in the controller 18.

The Fieldbus protocol allows the process control components (e.g., the function blocks, objects, etc. of a field device and the controller) to communicate across the non-proprietary databus 30 using a standard set of message formats and describes the communication services, message formats, and protocol behaviors required to build messages to be placed onto the communication stack of each device and provided to the user layer. Because the Fieldbus message specification layer supplies standardized communications for the user layer, specific Fieldbus message specification communication services are defined for each type of object described above. For example, the Fieldbus message specification layer includes object dictionary services that allow a user to read an object dictionary of a device. The object dictionary stores object descriptions that describe or identify each of the objects (such as block objects) of a device. The Fieldbus message specification layer also provides context management services which allows a user to put communication relationships, known as virtual communication relationships (VCRs), associated with one or more objects of a device, into the correct state. Still further, the Fieldbus message specification layer provides variable access services, event services, upload and download services, and program invocation services, all of which are well known in the Fieldbus protocol and, therefore, will not be described in more detail herein. The Fieldbus access sublayer maps the Fieldbus message specification layer into the data link layer.

To enable operation of these layers, each Fieldbus device includes a management information base (MIB), which is a database that stores VCRs, dynamic variables, statistics, link active scheduler timing schedules, function block execution timing schedules and device tag and address information. Of course, the information within the MIB may be accessed or changed at any time using standard Fieldbus messages or commands. Furthermore, a device description is usually provided with each device to give a user or a host an extended view of the information in the virtual field device (VFD). A device description, which must typically be tokenized to be used by a host, stores information needed for the host to understand the meaning of the data in the VFDs.

To implement any control strategy using function blocks distributed throughout a process control system, the execution of the function blocks must be precisely scheduled with respect to the execution of other function blocks in a particular control loop. Likewise, communication between different function blocks must be precisely scheduled on the bus 30 so that the proper data is provided to each function block before that block executes.

For communication to occur, the LAS, which can be the linking device 28 or any other smart field device having link master capability (e.g., one of the field devices 22–26), actively schedules and controls communications on the protocol bus 30. The LAS stores and updates a communication schedule (a link active schedule) containing the times that each function block of each device is scheduled to start periodic (i.e., synchronous) communication activity on the bus 30 and the length of time for which this communication activity is to occur. While there may be one and only one active LAS device on the bus 30, other smart field devices having link master device capability (such as the device 22) may serve as backup LASs and become active when, for example, the current LAS fails.

Generally speaking, communication activities over the bus 30 are divided into repeating macrocycles, each of which includes one synchronous communication for each function block (having external links) active on the bus 30 and one or more asynchronous communications for one or more of the function blocks or devices active on the bus 30. To conserve bandwidth on the bus 30, communications between two function blocks within a single device need not be published on the bus 30 and may be accomplished using communication links that are completely internal to the device.

During each macrocycle on the protocol bus 30, each of the function blocks active on the bus 30 executes, usually at a different, but precisely scheduled (synchronous) time and, at another precisely scheduled time, publishes its output data on the bus 30 in response to a compel data command generated by the master LAS, which is the linking device 28 unless one of the backup LASs (i.e., the field devices 22–26) takes control of the bus 30 as indicated above. Preferably, each function block is scheduled to publish its output data shortly after the end of the execution period of the function block. Furthermore, the data publishing times of the different function blocks are scheduled serially so that no two function blocks on the bus 30 publishes data at the same time. During the time that synchronous communication is not occurring, each field device is allowed, in turn, to transmit alarm data, view data, requests, etc. in an asynchronous manner using token driven communications. The execution times of each function block are stored in the management information base (MIB) of the device in which the function block resides while, as noted above, the times for sending the compel data commands to each of the devices on the bus 30 are stored in the MIB of the lining device 28. These times are typically stored as offset times because they identify the times at which a function block is to execute or send data as an offset from the beginning of an "absolute link schedule start time," which is known by all of the devices connected to the bus 30.

To effect communications during each macrocycle the LAS sends a compel data command to each of the devices on the bus 30 according to the list of transmit times stored in the link active schedule. Upon receiving a compel data command, a function block of a device publishes its output data on the bus 30. Because each of the function blocks is typically scheduled to execute so that execution of that block is completed shortly before the block is scheduled to receive a compel data command, the data published in response to a compel data command should be the most recent output data of the function block. However, if a function block is executing slowly and has not latched new outputs when it receives the compel data command, the function block publishes the output data generated during the last run of the function block and indicates that the published data is old data by not incrementing a sequence number that is sent with the data.

After the LAS has sent a compel data command to each of the function blocks on the bus 30 and during the times that function blocks are executing, the LAS may cause asynchronous communication activities to occur. To effect asynchronous communication, the LAS sends a pass token message to a particular field device. When a field device receives a pass token message, that field device has full access to the bus 30 and can send asynchronous messages, such as alarm messages, trend data, operator set point changes, requested data, etc. until the messages are complete or until a maximum allotted "token hold time" has expired. Thereafter, the field device releases the bus 30 and the LAS sends a pass token message to another device. This process repeats until the end of the macrocycle or until the LAS is scheduled to send a compel data command to effect synchronous communication. Of course, depending on the amount of message traffic and the number of devices and blocks coupled to the bus 30, not every device may receive a pass token message during each macrocycle.

Figure 4:
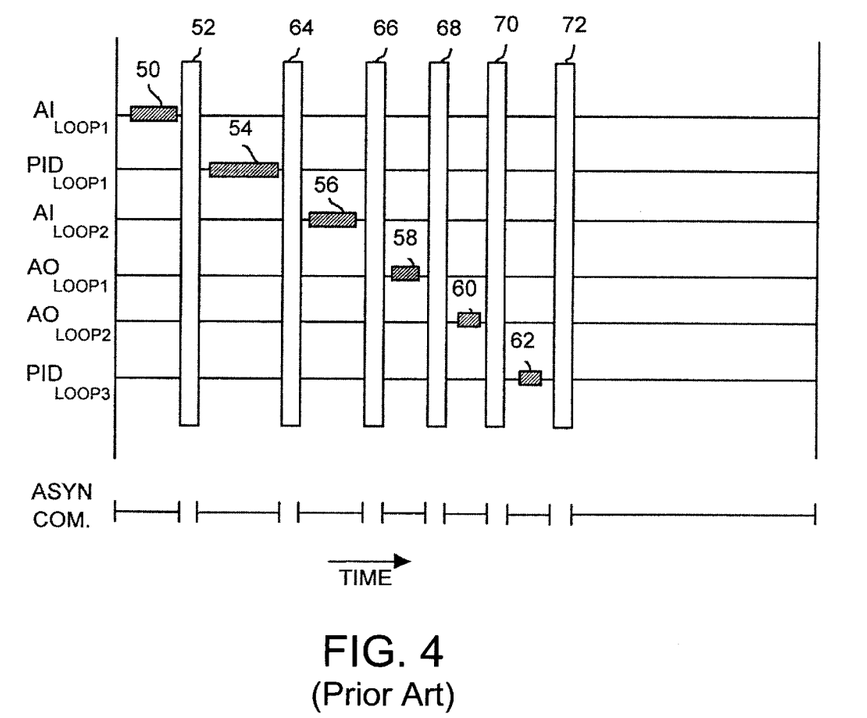
FIG. 4 is an exemplary timing schematic for a bus macrocycle within the process control system of FIG. 1.

FIG. 4 illustrates a timing schematic depicting the times at which function blocks on the bus 30 of FIG. 1 execute during each macrocycle of the bus 30 and the times at which synchronous communications occur during each macrocycle associated with the bus 30. In the timing schedule of FIG. 4, time is indicated on the horizontal axis and activities associated with the different function blocks of the positioner/valve 22 and the transmitter 24 (of FIG. 2) are illustrated on the vertical axis. The control loop in which each of the functions blocks operates is identified in FIG. 4 as a subscript designation. Thus $AI_{LOOP1}$ refers to the AI function block 42 of the transmitter 24, $PID_{LOOP1}$ refers to the PID function block 36 of the positioner/valve 22, etc. The block execution time of each of the illustrated function blocks is depicted by a cross-hatched box while each scheduled synchronous communication is identified by a vertical bar in FIG. 4.

Thus, according to the timing schedule of FIG. 4, during any particular macrocycle of the bus 30 (FIG. 1), the $AI_{LOOP1}$ function block executes first for the time period represented by the box 50. Then, during the time period indicated by the vertical bar 52, the output of the $AI_{LOOP1}$ function block is published on the bus 30 in response to a compel data command from the LAS. Likewise, the boxes 54–62 indicate the execution times of the function blocks $PID_{LOOP1}$, $AI_{LOOP2}$, $AO_{LOOP1}$, $AO_{LOOP2}$, and $PID_{LOOP3}$, respectively (which are different for each of the different blocks), while the vertical bars 66, 70 and 72 indicate the times that the function blocks $AI_{LOOP2}$, $AO_{LOOP2}$, and $PID_{LOOP3}$, respectively, publish data on the bus 30. The function blocks $PID_{LOOP1}$ and $AO_{LOOP1}$ are not published on the bus 30 because they both reside within the positioner/valve device 22.

As will be apparent, the timing schematic of FIG. 4 also illustrates the times available for asynchronous communication activities, which may occur during the execution times of any of the function blocks and during the time at the end of the macrocycle during which no function blocks are executing and when no synchronous communication is taking place on the bus 30. Of course, if desired, different function blocks can be intentionally scheduled to execute at the same time and not all function blocks must publish data on the bus 30 if, for example, no other device subscribes to the data produced by a function block, or if, as noted above, the data can be communicated between function blocks within the same device using communication links that are internal to the device.

Fieldbus devices are able to publish or transmit data and messages over the bus 30 using one of three VCRs defined in the Fieldbus access sublayer of the stack of each field device. A client/server VCR is used for queued, unscheduled, user initiated, one to one, communications between devices on the bus 30. Such queued messages are sent and received in the order submitted for transmission, according to their priority, without overwriting previous messages. Thus, a field device may use a client/server VCR when it receives a pass token message from an LAS to send a request message to another device on the bus 30. The requester is called the "client" and the device that receives the request is called the "server." The server sends a response when it receives a pass token message from the master LAS. The client/server VCR is used, for example, to effect operator initiated requests such as set point changes, tuning parameter access and changes, alarm acknowledgments, and device uploads and downloads.

A report distribution VCR is used for queued, unscheduled, user initiated, one to many communications. For example, when a field device with an event or a trend report receives a pass token from the master LAS, that field device sends its message to a "group address" defined in the Fieldbus access sublayer of the communication stack of that device. Devices that are configured to listen on that VCR will receive and decode the report. The report distribution VCR type is typically used by Fieldbus devices to send alarm notifications to operator consoles.

A publisher/subscriber VCR type is used for buffered, one to many communications. Buffered communications are ones that store and send only the latest version of the data and, thus, new data completely overwrites previous data. Function block outputs, for example, comprise buffered data. A "publisher" field device publishes or broadcasts a message using the publisher/subscriber VCR type to all of the "subscriber" field devices on the bus 30 when the publisher device receives a compel data message from the master LAS or from a subscriber device. The publisher/subscriber relationships are configured and are defined and stored within the Fieldbus access sublayer of the communication stack of each field device.

To assure proper communication activities over the bus 30, the master LAS periodically sends a time distribution message to all of the field devices connected to the bus 30 which enables the receiving devices to adjust their local data link time to be in synchronization with one another. Between these synchronization messages, clock time is independently maintained in each device based on its own internal clock. Clock synchronization allows the field devices to synchronize function block execution across the segment.

Before discussing the linking device 28 in greater detail below, it is important to recognize that conventional control systems do not allow smart field devices using, for example, a Fieldbus communication protocol to seamlessly integrate with a DCS controller. In these conventional systems, the controller lacks a communication stack for communicating with and, more importantly, for enabling interoperation with smart field devices that communicate with one another via a non-proprietary communication bus, such as a communication bus that uses the Fieldbus protocol. The inability of the controller to communicate freely with the smart field devices results in several significant drawbacks. For instance, function block information in the field devices and function block information resident in the controller cannot be linked to one another to form control loops, which prevents a user from making the most efficient use of hardware. In other words, function blocks resident in the controller cannot be shared with control loops that use any field device resident function blocks. Additionally, the user, who generally interfaces with the control system via a user terminal that communicates with the controller, cannot readily access the information being generated in and exchanged between the smart field devices. Thus, troubleshooting a communications problem on the protocol bus requires the system user to locally monitor (using largely manual procedures) the protocol bus over an extended period of time, which is very difficult, time consuming and expensive.

The linking device 28 of the invention allows a DCS controller to communicate freely with smart field devices. Generally speaking, the linking device 28 provides a communication gateway or bridge between smart field devices that communicate using a non-proprietary protocol and a controller that may not be using the non-proprietary protocol. More specifically, the linking device 28 montitors all the communications on the smart field device protocol bus and processes the monitored communications so that function block information subscribed to by the controller may be conveyed to the controller as needed, identification information (e.g., addresses, tags, etc.) associated with a field device may be conveyed to a user terminal, and diagnostic information (such as timing and linking problems) associated with the field device protocol bus can be generated by detecting a deviation between the actual communications on the bus and the scheduled communications in accordance with a link active schedule that is stored in the linking device 28. Additionally, the linking device 28 receives function block information from the controller and can convey it along the protocol bus using Fieldbus attributes (i.e., by emulating a publishing field device) to subscribing field devices.

Figure 5:
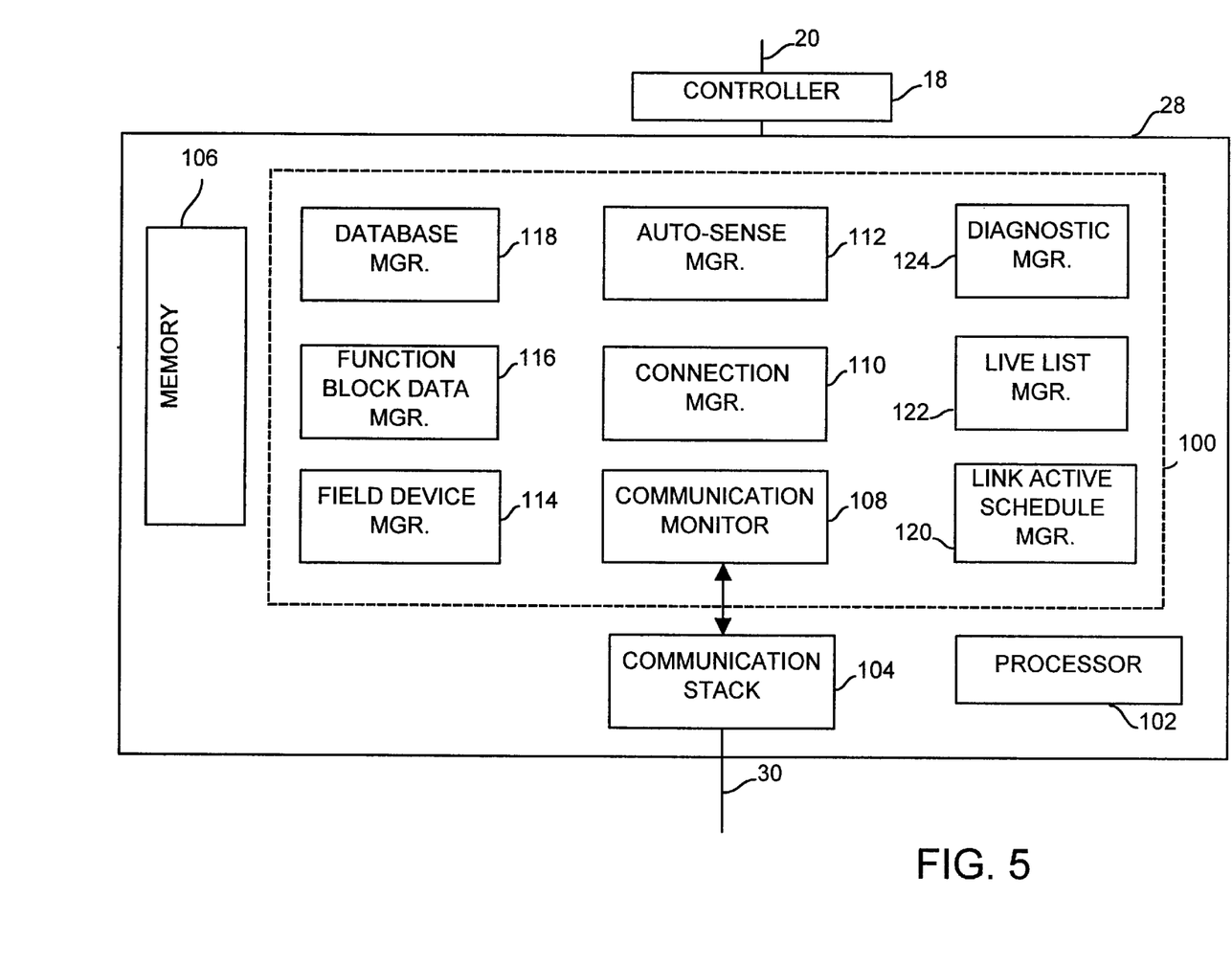
FIG. 5 is an exemplary block diagram of the linking device shown in FIGS. 1 and 2.

FIG. 5 illustrates a more detailed block diagram of the linking device 28 shown in FIGS. 1 and 2. The linking device 28 allows a complete and seamless integration of the field devices 22–26 (FIG. 1) with the process control system 10 (FIG. 1). For instance, in addition to providing conventional communication links between the function block parameters of the smart field devices 22–26 on the non-proprietary protocol bus 30, the linking device 28 also enables communication links between function blocks of the field devices 22–26 and function blocks that reside within the controller 18. Thus, the linking device 28 allows a user to define control loops using combinations of function blocks that reside in the controller 18 and in one or more of the field devices 22–26, thereby eliminating the constraint found in conventional process control systems wherein all the function block parameters associated with a given control loop are required to reside entirely within the smart devices 22–26 on the protocol bus 30 or entirely within the controller 18.

As noted above, the linking device 28 also provides diagnostic capabilities for facilitating the troubleshooting of communication problems on the field device protocol bus 30. The linking device 28 monitors and analyzes substantially all of the communications on the protocol bus 30 and uses the link active schedule as a communication template to identify communication and linking problems, such as where a field device fails to provide fresh data at the correct time to the correct recipient, or completely fails to provide any data. Because the linking device 28 can communicate freely with the controller 18, the diagnostic information can be easily conveyed to the user at the system level (i.e., a user terminal), which eliminates the need for the user to locally monitor and manually determine field device communication problems, as is the case with prior art systems.

The linking device 28 automatically subscribes to all communications on the protocol bus 30 using, for example, the link active schedule. Because the link active schedule contains a communication template for the protocol bus 30, the linking device 28 can determine the precise times at which particular field devices are scheduled to communicate on the bus 30. Thus, by comparing the link active schedule to the actual communications on the bus 30, deviations from the link active schedule can be identified as possible communication problems with particular field devices. These deviations from the link active schedule can be used by the linking device 28 to generate diagnostic information associated with the smart field devices 22–26 that may be useful in troubleshooting and/or configuring the process control system 10 (FIG. 1). For example, the diagnostic information may include linking problems such as a failure of a device to transmit data properly to a subscribing device and/or may include timing problems that may be identified using statistical information such as, for example, the number of times a device has failed to provide fresh data to a subscribing device. Of course, a wide variety of other diagnostic information can be generated by making appropriate comparisons and analyses of the actual and scheduled communication activities.

Additionally, because the linking device 28 can freely communicate with the field devices 22–26, the linking device 28 can use asynchronous communications to interrogate one or more of the field devices 22–26 for identification information that is needed by or requested by a user at the system level. For example, the user may request, via the user terminal, the view list information (which includes field device configuration information) associated with a particular one of the field devices 22–26. To accomplish this, the controller 18 can then communicate via the linking device 28 to issue an asynchronous request on the protocol bus 30 for view list information (e.g., address, tag, VCR, etc.) from one of the field devices 22–26.

As shown in FIG. 5, the linking device 28 includes a plurality of functional blocks 100 that are controlled by a processor 102 to publish and subscribe to communications on the protocol bus 30 via a communication stack 104. As discussed generally above, the linking device 28 is also in communication with the controller 18 and may receive information from the controller 18 to be published on the protocol bus 30. In this manner, the linking device 28 enables control loops to include function blocks in both the controller 18 and in the field devices 22–26. For example, a process control loop within the controller 18 may include several function blocks that are resident in the controller 18 that may interoperate with one or more function blocks that are resident in one or more of the field devices 22–26. Because, as will be discussed in more detail below, the linking device 28 automatically subscribes to all function block information that is published by the field devices 22–26, the linking device 28 may store a variety of information associated with the field devices 22–26 in a memory 106, including function block information associated with the devices 22–26, such as, for example, the information associated with the AI function block 44 (FIG. 2) needed by the controller 18, as well as other function block information, diagnostic information, etc.

By way of example only, the interconnected function blocks making up the control loop indicated as LOOP2 in FIG. 2 will be discussed below to illustrate the manner in which function blocks in the controller 18 are linked via the linking device 28 with function blocks in the field devices 22–26. In the case of LOOP2, the PID function block 46 of the controller 18 is communicatively coupled to the AO function block 40 of the positioner/valve 22 and the AI function block 44 of the transmitter 24. While the function blocks residing within the field devices 22–26 use conventional Fieldbus link objects to communicate with one another over the non-proprietary data bus 30, the PID function block 46 residing in the controller 18 uses a custom link object located within the linking device 28 to communicate with the AI function block 44 and the AO function block 40 via the linking device 28 and the protocol bus 30.

Similarly, in executing the control loop LOOP2 the controller 18 may publish information on the protocol bus 30. For example, the controller 18 receives the information associated with AI function block 44 and processes the information within the PID function block 46. The output of the PID function block 46 may then be conveyed to the linking device 28 where it is, at the appropriate time, published on the bus 30 to be received by the AO function block 40. The linking device 28 uses custom link objects within the linking device 28 to automatically convey function block information between the controller 18 and the field devices 22–26 so that, such as with the above-described LOOP2, controller resident function blocks and field device resident function blocks can interoperate in a seamless manner. The custom link objects may be stored in the memory 106 and can be used by the connection manager 110, the function block data manager 116 and the database manager 118 to automatically convey function block information between the field devices 22–26 and the controller 18.

Likewise, in executing the control loop LOOP2, the controller 18 may subscribe to information on the protocol bus 30. For example, the controller 18 subscribes to the output of the AO function block 40, which is used as a feedback input to the controller resident PID function block 46. The linking device 28 subscribes to substantially all communications on the protocol bus 30 and sends information to the controller 18 for linking and display purposes. In the case of information subscribed to by the controller 18 (e.g., function block information such as the output of the AO function block 40), the linking device sends information to the controller 18 at the appropriate time in accordance with the link active schedule.

The functional blocks 100 within the linking device 28 include, but are not limited to, a communication monitor 108, a connection manager 110, an auto-sense manager 112, a field device manager 114, a function block data manager 116, a database manager 118, a link active schedule manager 120, a live list manager 122, and a diagnostic manager 124. The functional blocks 100 may be implemented using any desired combination of hardware and software. Generally, the functional blocks 100 may be efficiently implemented using the processor 102 to execute a number of software code segments or modules that are retrieved from the local computer readable memory 106. However, other combinations of hardware and software using, for example, algorithm specific integrated circuits (i.e., ASICs) or other types of hardware may be used to accomplish the same functions without departing from the scope of the invention.

A general outline of the functions of the above-noted functional blocks 100 will be provided below and will be followed with a more detailed discussion of how the various functional blocks cooperate to provide a seamless integration of smart field devices with a DCS controller and to provide communication troubleshooting capabilities that allow a system user to remotely troubleshoot the smart field device protocol bus from a user interface.

The communication stack 104 is a conventional Fieldbus communication stack, which allows the functional blocks 100 to communicate (i.e., receive and send) information along the protocol bus 30 to the field devices 22–26 (FIG. 1). The communication monitor 108 monitors all communications on the bus 30 and routes the information to one or more of the other functional blocks 110–124 for further processing.

The connection manager 110 uses the communication stack 104 to coordinate communications on the protocol bus 30. For instance, the connection manager 110 may use the link active schedule, a copy of which is stored in the memory 106, to send/receive information from the field devices 22–26 during either asynchronous or synchronous communication intervals of a macrocycle on the bus 30. Some of the information transmitted synchronously may include function block information needed by or sent by function blocks within the controller 18. In this manner, the connection manager allows the linking device 28 to emulate the synchronous communication characteristics of a field device.

The field device manager 114 controls the downloading of configuration information to the Fieldbus devices. For example, VCRs, addresses, tags, etc. may be sent by a user via the user interfaces 12 and 14, the controller 18, and the linking device 28 to one or more of the field devices 22–26.

The link active schedule manager 120 controls the loading of the link active schedule in any other link active schedulers that may be present on the protocol bus 30. The database manager 118 stores fieldbus information for reporting to the controller 18. The fieldbus information stored in the database manager 118 may include view list information, data subscribed to by the controller 18 (i.e., function block information), statistical information relating to the communications on the bus 30, etc. The diagnostic manager 124 detects communication problems on the protocol bus 30 and reports the problems to the user via one of the user interfaces 12 and 14, the controller 18 and the system level network 20.

Generally speaking, the functional blocks 100 of the linking device 28 cooperate to enable the linking of controller resident function block information with function block information resident in one or more of the field devices 22–26. More specifically, the function block data manager 116 coordinates the linking of function blocks between the controller 18 and the field devices 22–26. For example, the database manager 118 may store information to be published on the protocol bus 30 in the memory 106. This stored information may include function block information received by the linking device 28 from the controller 18, such as, for example, the output of the PID function block 46. The function block data manager 116, at the appropriate time according to the link active schedule (which is stored in the memory 106), establishes a communication link via the connection manager 110 and the communication stack 104 to publish the information (e.g., the output of the PID function block 46) on the protocol bus 30.

Similarly, the database manager 118 may store information in the memory 106 that is needed (e.g., subscribed to) by the controller 18, such as, for example, the output of AO function block 40. Based on the link active schedule, the communication monitor 108 monitors substantially all the communications on the protocol bus 30 via the connection manager 110 and the communication stack 104 and processes the monitored communications. Some of the processed communications, which may include information subscribed to by the controller 18, are stored via the database manager 118 in the memory 106. Because the linking device 28 knows, based on the link active schedule, when the controller 18 needs to receive function block information (e.g., the output of the AO function block 40), it may use the database manager 118 to retrieve the function block information that the controller 18 subscribes to from the memory 106 and convey it to the controller 18 when updated based on the link active schedule. Thus, the database manager 118, the connection manager 110, the function block data manager 116 and the communication monitor 108 function blocks work together to provide the above-described seamless integration of function blocks resident in the controller 18 and function blocks resident in the field devices 22–26.

Using conventional Fieldbus communication protocols, the function block data manager 116 also scans view list information contained within the field devices 22–26. For example, a user may request via one of the user interfaces 12 and 14 that view list information associated with a particular one of the field devices 22–26 be retrieved. In this case, the controller 18 sends commands to the linking device 28 that cause the function block data manager 116 to establish, via the connection manager 110 and the communication stack 104, asynchronous communications with the appropriate one of the smart field devices 22–26. In this manner, the function block data manager 116 may retrieve the view list information and convey it to the controller 18 using the communication protocol of the controller 18.

The auto-sense manager 112, the live list manager 122 and the diagnostic manager 124 work together to automatically analyze/detect and report to the user communication problems associated with communications on the protocol bus 30, thereby enabling the above-described troubleshooting capabilities of the invention. The auto-sense manager 112 uses the link active schedule and the live list to identify and to communicate with the field devices 22–26, via the connection manager 110 and the communication stack 108. As discussed in greater detail below, the live list manager 122 detects when field devices are added to or are no longer communicating on the protocol bus 30 and reports changes to the auto-sense manager 112 and the diagnostic manager 124. The auto-sense manager 112 may collect and produce identification information such as addresses, tags, serial numbers, functional roles (e.g., whether the field device is a basic device or a bridge device), etc. that are associated with one or more of the field devices 22–26 and compare the identification information to commissioning (i.e., configuration) information stored in the database manager 118 and/or the memory 106. Based on the comparison, the auto-sense manager 112 determines if there is a discrepancy, such as, for example, if a device has been added to or removed from the protocol bus 30. To further improve the diagnostic capabilities of the linking device 28, the auto-sense manager 112 may be adapted to automatically report any discrepancy found to the user.

The linking device 28 stores a "live list," which is a list of all the devices that are connected to the data bus, i.e., all of the devices that are properly responding to a pass token message. The linking device 28 continually recognizes new devices added to a bus by periodically sending probe node messages to addresses that are not on the live list. In fact, in the Fieldbus protocol, the linking device 28 is required to probe at least one address after it has completed a cycle of sending pass token messages to all of the field devices in the live list. If a field device is present at the probed address and receives the probe node message, the device immediately returns a probe response message. Upon receiving a probe response message, the linking device 28 adds the device to the live list and confirms by sending a node activation message to the probed field device. A field device remains on the live list as long as that field device responds properly to pass token messages. However, the linking device 28 removes a field device from the live list if the field device does not, after three successive tries, either use the token or immediately return the token to the linking device 28.

Figure 6:
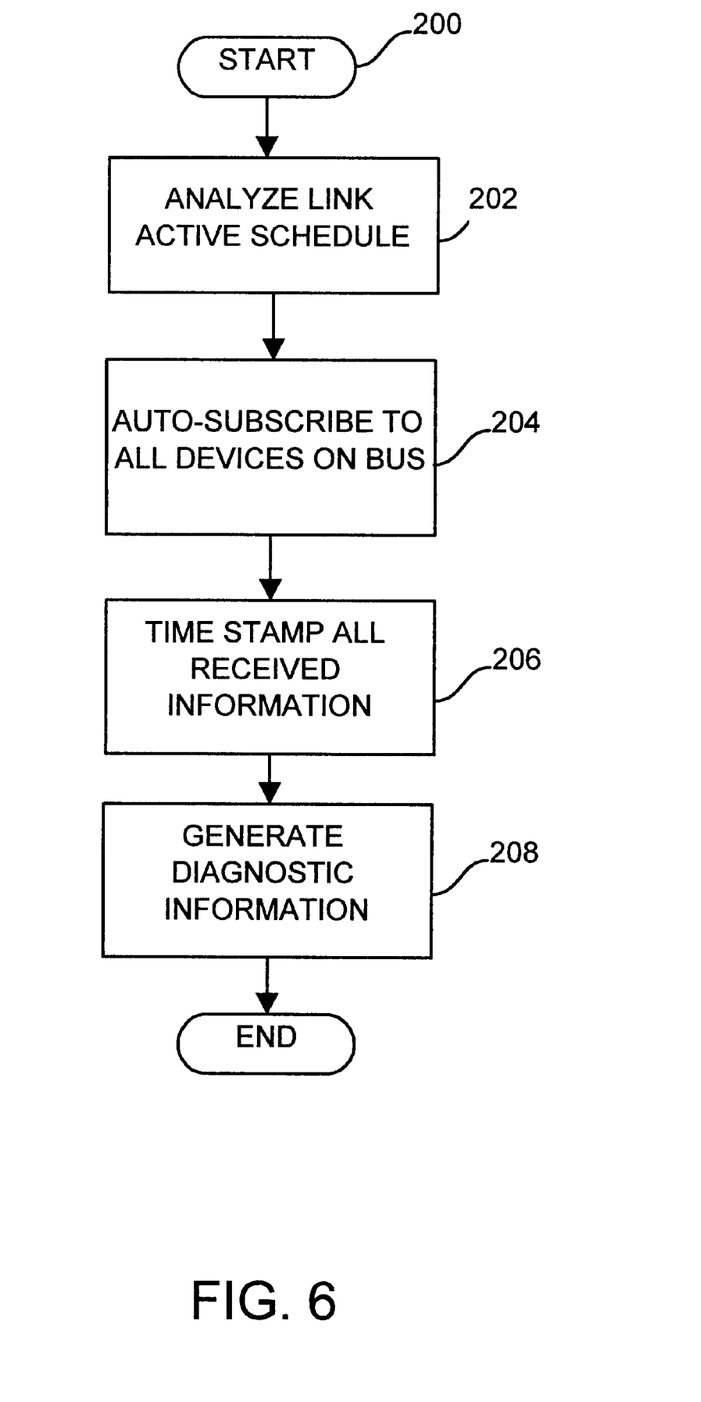
FIG. 6 is a flow diagram depicting a method by which the linking device of FIGS. 1 and 2 generates diagnostic information.

Now referring to FIG. 6, a flow diagram depicts a method 200 by which the linking device 28 of FIGS. 1 and 2 generates diagnostic information. In block 202 the linking device 28 analyzes the link active schedule to determine the identity of the devices that should be found on the protocol bus 30. In block 204, the linking device 28 auto-subscribes to all the devices that are listed in the link active schedule. In block 206, the linking device attaches a time stamp to all information received while monitoring the communications subscribed to on the bus 30 and in block 208 the linking device 28 uses the time stamped information to generate diagnostic information. The diagnostic information may include identification of field devices that are publishing stale data, worst case update rates between successive good values, which allows identification of synchronization problems, identification of devices that have failed to provide data at scheduled times, and generally, linking and timing problems associated with the communications on the bus 30.

If implemented in software, the functional blocks and process control routines discussed herein may be stored in any computer readable memory such as on a magnetic disk, a laser disk, or other storage medium, in a RAM or ROM of a computer, controller, field device, etc. Likewise, this software may be delivered to a user or a device via any known or desired delivery method including, for example, over a communication channel such as a telephone line, the Internet, etc.

While the invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A method of interfacing with a plurality of field devices in a process control system having a controller and a user interface communicatively coupled together, a linking device coupled to the controller, and a plurality of field devices communicatively coupled to the linking device via a communication network that uses a first communication protocol, the method comprising:
    monitoring substantially all communications on the communication network using the linking device;
    selectively processing at least some of the monitored communications in the linking device to obtain first function block information associated with a first function block implemented by one of the plurality of field devices; and
    sending the first function block information to a second function block implemented by the controller, wherein the first function block information is sent to the controller via a second communication protocol different than the first communication protocol, wherein the first function block and the second function block are part of a control loop.

2. The method of claim 1, further comprising:
    generating third function block information associated with a third function block implemented by the controller;
    receiving the third function block information at the linking device via the second communication protocol; and
    sending the third function block information to at least a fourth function block via the first communication protocol, wherein the fourth function block is implemented by one of the field devices.

3. The method of claim 1, further comprising selectively processing at least some of the monitored communications in the linking device to produce diagnostic information associated with the communications on the communication network.

4. The method of claim 3, wherein selectively processing at least some of the monitored communications in the linking device to produce diagnostic information includes producing information associated with linking and timing of the communications on the communication network.

5. The method of claim 3, wherein the selectively processing at least some of the monitored communications in the linking device to produce diagnostic information includes producing communication statistics associated with the communications on the communication network.

6. The method of claim 3, further comprising conveying at least some of the diagnostic information to the controller via the second communication protocol.

7. The method of claim 1, further comprising selectively processing at least some of the monitored communications in the linking device to produce identification information associated with one of the field devices.

8. The method of claim 7, further comprising conveying the identification information to a memory in the linking device.

9. The method of claim 7, further comprising conveying the identification information to the process control system via the controller.

10. The method of claim 7, further comprising:
    comparing the identification information to commissioning information stored in a memory in the linking device;
    determining a discrepancy between the commissioning information and the identification information based on the comparison; and
    notifying a user of the discrepancy.

11. The method of claim 10, wherein determining a discrepancy includes determining that a field device has been added to the communication network.

12. The method of claim 10, wherein determining a discrepancy includes determining that one of the field devices is no longer communicating on the communication network.

13. The method of claim 1, further comprising selectively processing at least some of the monitored communications in the linking device to scan view list information in at least one of the field devices.

14. The method of claim 13, further comprising conveying the view list information to the controller.

15. The method of claim 1, wherein the first communication protocol is the Fieldbus protocol.

16. A linking device for interfacing with a plurality of field devices having function blocks communicatively coupled via a communication network that uses a first communication protocol and a controller, the linking device comprising:
   a stack communicatively coupled to the communication network that uses the first communication protocol to monitor substantially all communications on the communication network;
   a connection manager that uses the communication stack to coordinate communications on the communication network;
   a function block data manager that selectively processes at least some of the monitored communications to produce function block information that is associated with a function block implemented by at least one of the field devices; and
   a database manager that sends the function block information to the controller via a second communication protocol and receives another function block information associated with another function block implemented by the controller to be sent to said at least one of the field devices as part of a control loop different than the first communication protocol.

17. The device of claim 16, wherein the connection manager receives field device information associated with the controller and sends it to one of the field devices via the communication network.

18. The device of claim 16, further comprising a diagnostic manager that selectively processes at least some of the monitored communications to produce diagnostic information associated with the communications on the communication network.

19. The device of claim 18, wherein the diagnostic information includes information associated with linking and timing of the communications on the communication network.

20. The device of claim 18, wherein the diagnostic information includes communication statistics associated with the communications on the communication network.

21. The device of claim 18, wherein the diagnostic manager is adapted to convey at least some of the diagnostic information to the controller.

22. The device of claim 16, further comprising:
   a live list manager that stores a live list identifying the devices attached to the communication network; and
   an auto-sense manager that uses the live list to selectively process at least some of the monitored communications to produce identification information associated with at least one of the field devices on the communication network.

23. The device of claim 22, wherein the linking devices includes a memory that stores commissioning information and wherein the auto-sense manager compares the identification information to the commissioning information stored in the linking device memory to determine a discrepancy between the commissioning information and the identification information based on the comparison.

24. The device of claim 23, wherein the linking device notifies a user of the discrepancy.

25. The device of claim 16, wherein the database manager is adapted to retrieve view list information.

26. The device of claim 16, wherein the database manager is adapted to convey the view list information to the controller.

27. The device of claim 16, wherein the first communication protocol is the Fieldbus protocol.

28. A field device interface system for use in a process control system having a controller and a user interface communicatively coupled together, a linking device having a processor therein coupled to the controller, and a plurality of field devices communicatively coupled to the linking device via a communication network that uses a first communication protocol, comprising:
   a computer readable memory in the linking device;
   a monitoring routine stored on the memory and adapted to be executed by the processor that monitors substantially all communications on the communication network;
   a communications processing routine stored on the memory and adapted to be executed by the processor that selectively processes at least some of the monitored communications to produce first function block information associated with a first function block implemented by one of the plurality of field devices; and
   a linking routine stored on the memory and adapted to be executed by the processor that sends the first function block information to a second function block implemented by the controller, wherein the first function block information is sent to the controller via a second communication protocol different than the first communication protocol wherein the first function block and the second function block are part of a control loop.

29. The field device interface system of claim 28, wherein the linking routine is further adapted to:
   receive third function block information from the controller via the second communication protocol, wherein the third function block information is associated with a third function block implemented by the controller; and
   send the third function block information to at least a fourth function block via the first communication protocol, wherein the fourth function block is implemented by one of the field devices.

30. The field device interface system of claim 28, wherein the communications processing routine is further adapted to produce diagnostic 31. The field device interface system of claim 28, wherein the communications processing routine is further adapted to produce diagnostic information associated with the communications on the communication network. information that includes information associated with linking and timing of the communications on the communication network.

32. The field device interface system of claim 31, wherein the communications processing routine is further adapted to produce diagnostic information that includes communication statistics associated with the communications on the communication network.

33. The field device interface system of claim 31, wherein the communications processing routine is further adapted to convey the diagnostic information to the controller.

34. The field device interface system of claim 28, wherein the communications processing routine is further adapted to produce identification information associated with at least one of the field devices.

35. The field device interface system of claim 34, wherein the communications processing routine is further adapted to convey the identification information to the memory in the linking device.

36. The field device interface system of claim 34, wherein the communications processing routine is further adapted to convey the identification information to the controller.

37. The field device interface system of claim 34, wherein the memory includes commissioning information stored therein and further comprising an identification information processing routine stored on the memory and adapted to be executed by the processor that compares the identification information to the commissioning information to determine a discrepancy between the commissioning information and the identification information.

38. The field device interface system of claim 37, wherein the identification information processing routine notifies a user of the discrepancy.

39. The field device interface system of claim 37, wherein the discrepancy indicates that a field device has been added to the communication network.

40. The field device interface system of claim 37, wherein the discrepancy indicates that one of the field devices is no longer communicating on the communication network.

41. The field device interface system of claim 28, wherein the communications processing routine is further adapted to produce view list information.

42. The field device interface system of claim 41, wherein the communications processing routine is further adapted to convey the view list information to the controller.

43. The field device interface system of claim 28, wherein the first communication protocol is the Fieldbus protocol.

* * * * *

UNITED STATES PATENT AND TRADEMARK OFFICE
CERTIFICATE OF CORRECTION

PATENT NO. : 6,618,745 B2
DATED : September 9, 2003
INVENTOR(S) : Daniel D. Christensen et al.

It is certified that error appears in the above-identified patent and that said Letters Patent is hereby corrected as shown below:

Column 2,
Line 42, delete "the liking device" and insert -- the linking device --.

Column 5,
Line 61, delete "are located are identified" and insert -- are located and identified --.

Column 17,
Line 18, delete "a stack" and insert -- a communication stack --.

Column 18,
Line 53, delete "produce diagnostic" and insert -- produce diagnostic information associated with the communications on the communication network. --.
Line 56, delete "produce diagnostic information associated with the communciations on the communication network. information that includes information associated with linking" and insert -- produce diagnostic information that includes information assicated with linking --.

Signed and Sealed this

Fourteenth Day of September, 2004

JON W. DUDAS
*Director of the United States Patent and Trademark Office*

UNITED STATES PATENT AND TRADEMARK OFFICE
CERTIFICATE OF CORRECTION

PATENT NO. : 6,618,745 B2
DATED : September 9, 2003
INVENTOR(S) : Daniel D. Christensen et al.

It is certified that error appears in the above-identified patent and that said Letters Patent is hereby corrected as shown below:

Column 2,
Line 42, delete "the liking device" and insert -- the linking device --.

Column 5,
Line 61, delete "are located are identified" and insert -- are located and identified --.

Column 17,
Line 18, delete "a stack" and insert -- a communication stack --.

Column 18,
Line 53, delete "produce diagnostic" and insert -- produce diagnostic information associated with the communications on the communication network. --.
Line 56, delete "produce diagnostic information associated with the communciations on the communication network. information that includes information associated with linking" and insert -- produce diagnostic information that includes information associated with linking --.

Signed and Sealed this

Fifth Day of October, 2004

JON W. DUDAS
*Director of the United States Patent and Trademark Office*